Aug. 27, 1963    J. L. KLEINMAN    3,101,803
ADJUSTABLE ILLUMINATED SCALE STRUCTURE
Filed Jan. 3, 1958
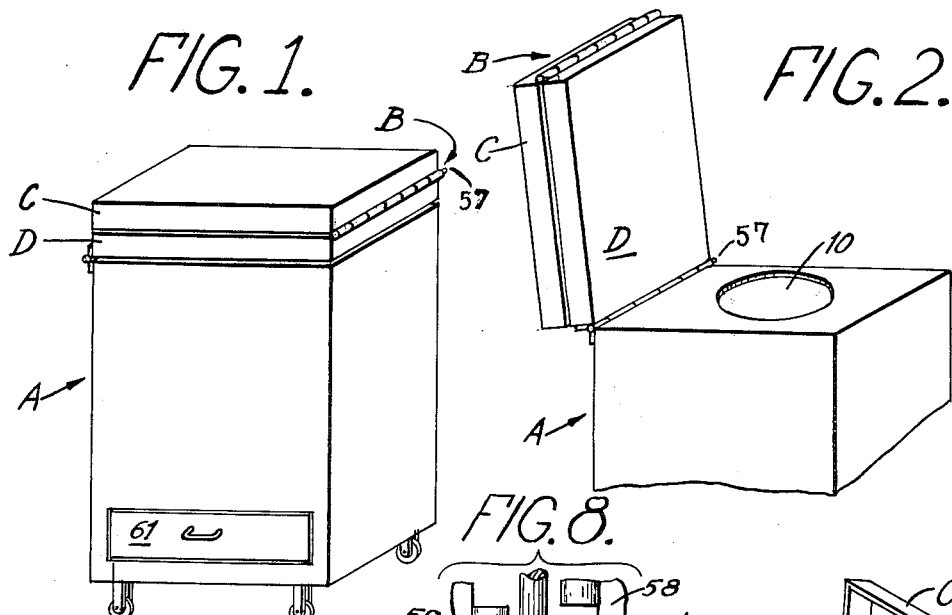
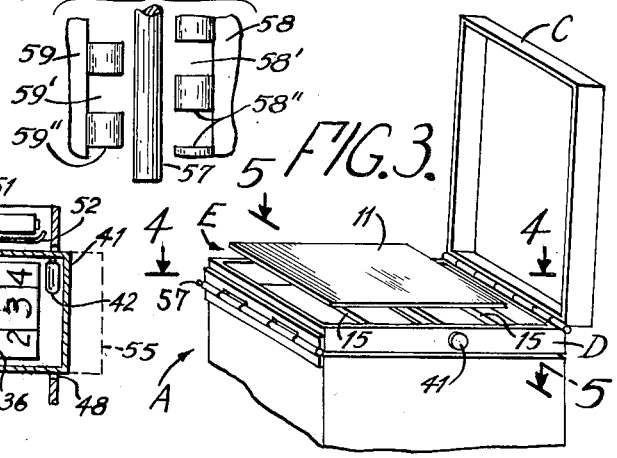
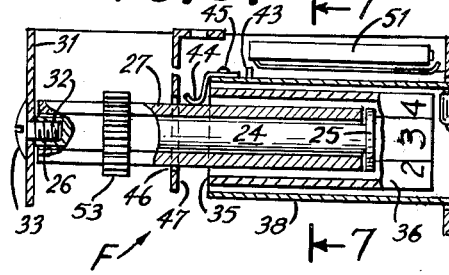
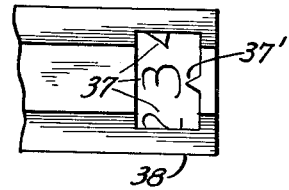
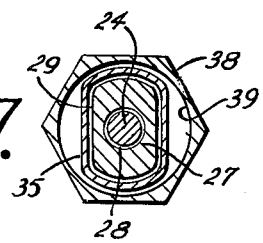
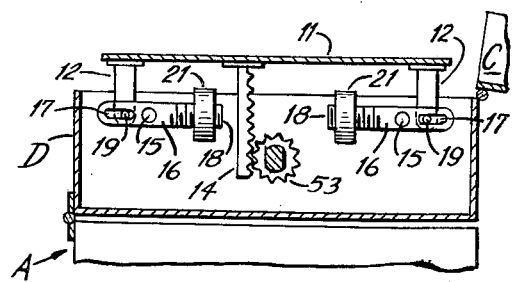
INVENTOR.
Jacob L. Kleinman

United States Patent Office 3,101,803
Patented Aug. 27, 1963

3,101,803
ADJUSTABLE ILLUMINATED SCALE STRUCTURE
Jacob L. Kleinman, Hotel Kimberly, 74th St. at Broadway, New York, N.Y.
Filed Jan. 3, 1958, Ser. No. 707,027
2 Claims. (Cl. 177—177)

This invention relates to the construction of scales in general, and more particularly so in combination with electrically operated, or gas operated, washing machines, or dryers, or a combination of both.

In accordance with my invention, I produce a scale structure wherein a dial or indicator element provided with weight indicating numerals may be moved outwardly for beter and clearer vision and then be moved back into the scale structure for protection against breakage.

A weighing scale constructed in accordance with my invention, of whatever shape, style or type it may be made, can be utilized to great advantage as a separate scale or, for example, as a part of a washing or drying machine to avoid over-loading such machine with washing-clothes thereby preventing or minimizing over-straining of the machine-motor while operating, thus prolonging the life and usefulness of such motor and machine and, in addition thereto, such scale may be ready for weighing the next load without interrupting or interfering with the washing operation or drying operation of the machine. Furthermore, if desired, the scale may be easily removed from the machine to facilitate the weighing of various other items and then be easily reattached to such machine, thereby eliminating the necessity of buying other scales for various weighing purposes. Also, the fact that the dial provided with indicating numerals can be moved outwardly will greatly facilitate the reading of such numerals during the weighing operation.

It is thus evident, that an instrument, or structure, of this kind or type made in accordance with my invention, fulfills a long-felt need in the art of making structures of this kind. It teaches a new and unique form of arrangement of parts not known heretofore in the art of making such machines or scales. It performs new functions and provides new comfort to the user in a manner whereby such machine, or scale, may become a popular and indispensable household item and thus of commercial value.

For a fuller understanding of the nature and objects of my invention herein, reference is had to the following detailed description in connection with the accompanying drawing, in which:

FIG. 1 is a perspective view of a washing machine, including my scale structure, in closed position;

FIG. 2 is a perspective view, partly broken away, of the machine having its cover in an hinged-open position;

FIG. 3 is a perspective view of the machine cover, having the upper portion thereof in an hinged-open position, and the lower portion thereof covering the open space of the washing machine, also showing the scale structure which is carried by the lower portion of the washing machine cover, the washing machine partly broken away;

FIG. 4 is a cross-sectional view taken along the line 4—4 of FIG. 3;

FIG. 5 is a partial cross-sectional view taken along the line 5—5 of FIG. 3;

FIG. 6 is a view of a portion of the scale showing the indicating numerals;

FIG. 7 is a partial cross-sectional view taken along the line 7—7 of FIG. 5; and FIG. 8 is a perspective view of the separated hinge portions.

I show the several figures or views for illustrative purposes and for a better and clearer understanding of my invention, and not for limitation purposes.

Referring more particularly to the drawing, which illustrate the novel structure of my herein invention, in which similar reference characters identify similar parts in the several views:

Arrow A indicates a washing machine (or drier, or combination of both) having an opening or spaced section indicated by numeral 10, and a cover element indicated by arrow B secured to the washing machine in a hingeable or pivotal manner for covering such spaced section 10.

The cover element comprises two hollow sections, an upper section C and an under section D; the under section D serves as means for covering the open spaced section 10 and simultaneously therewith for supporting a scale structure thereon (scale structure indicated by arrow E), and the upper section C serves as means for covering the scale structure when the latter is not in use.

The scale structure indicated by arrow E may be constructed in any suitable manner or style; for example, the carrier or platform 11 (shaped in any desirable manner) may be provided with a pair of extensions, projections or lugs 12 (FIG. 4) and with a notch-bar or rack 14. The inner portion of the under section D may be provided with suitably constructed bars or supports 15 for carrying pivotal elements 16. Such elements 16 are each provided with a longitudinal slot or opening 17 and with a screw-threaded end portion 18. A pin 19 is secured within openings of each of the lugs 12. One of such pins 19 is positioned loosely within one of the slots 17 and the other of such pins 19 is positioned loosely within the other of the slots 17. A weighing-member 21 having a screw-threaded opening is secured in a rotatable manner upon each of the screw-threaded end portions 18.

A rotatable structure, indicated by arrow F, is carried by the inner portion of the under section D. This rotatable structure comprises a longitudinal circular-shaped shaft 24 having a shoulder portion 25 and a screw-threaded opening 26; upon this shaft 24 is positioned in a rotatable manner a tubular member 27 having a circular-shaped central bore 28 and a non-circular outer periphery (cross-sectionally thereof) 29. The shaft 24 is secured to a wall portion 31 within the under section D by suitable means; for example, a screw-threaded element 32 may be positioned within the screw-threaded opening 26, having its head-portion 33 engaging tightly the outer face of the wall portion 31, in a manner bringing the end portion (having the screw-threaded opening 26) close to the inner face of such wall portion 31 for holding the shaft 24 in a fixed stationary position within the said under section D. The tubular member 27 is shorter in size than that of the length of the shaft 24 and is held in position by the shoulder portion 25 against accidental displacement.

A non-circular-shaped tubular dial element 35, having a front portion 36 provided with circumferentially spaced numerals is supported for rotation with and axial adjustment on tubular member 27. An elongated non-circular-shaped portion 38 (for example hexagon style or any other suitable structure) provided with a circular-shaped opening 39 is carried by the tubular element 35 and has a window with a suitably shaped index 37' for cooperation with the numerals on the front portion of dial element 35. Such elongated portion 38 is provided with a front wall 41 and with an electric-bulb 42 located beyond such wall portion 41. The outer face of such elongated portion 38 is provided with a connector 43 and with a spring element 44 secured thereto by suitable means, for example solder, welding, screw or rivet 45. The tubular element 27 is supported by the circular-shaped opening 46 of the angular portion or extension 47, and the elongated portion 38 is supported by the non-circular opening 48. The inner portion of the under section D is provided with an electricsource-containing means 51 having a spring connector 52.

From the above the following will be apparent: When laundry, or other items, is placed upon the platform 11 the supporting lugs 12 will cause the elements 16 to pivot or hinge upon the supports 15, lifting the weighing-members 21 upwardly, and the rack 14 will turn or move the gear or toothed wheel 53 which in turn will rotate the tubular member 27 and simultaneously therewith rotate the tubular element 35 bringing certain of the numerals 37 towards the indicator 37', thus showing or indicating the weight of the item positioned upon the platform 11.

To facilitate the reading of the indicating numerals 37 I provided the tubular element 35 with a slidable friction-fit on the tubular member 27, and the tubular elongated portion 38 with a slidable spring-element 44 for engaging frictionally the tubular member 27 and simultaneously therewith also engaging the rear-end portion of the tubular element 35 so that, if desired, the front portion 41 may be moved outwardly (as indicated by the dotted lines 55). Such slidable action will move the numeral-indicating structure outwardly; the connector 43 will engage the spring-connector 52 and light the bulb 42, thus illuminating the spaced section containing the indicating numerals 37 for clearer vision.

FIG. 7 clearly shows that the tubular member 27 and the tubular element 35 are both rotatable for moving the indicating numerals 37 into proper position whereas the elongated portion 38 is not rotatable so that the lighting arrangement will always be effective, and the indicator 37' will always be in proper position, regardless of the rotatable movements of the numerals 37.

When the indicating structure (FIG. 5) will be moved outwardly the spring element 44 will engage and urge the tubular element 35 towards the same outward direction; and when such indicating structure will be moved inwardly then it will be the bulb 42, or other suitable arrangements of structure (not shown), that will urge the tubular element 35 towards such inward movement.

It is naturally understood that the upper section C, of the cover-structure indicated by arrow B, has to be in an hinged-open position to make the scale-structure available for weighing purposes (as shown in FIG. 3), but when not in use such section C may be hinged back into a position covering the scale-structure (as shown in FIG. 1). Suitable locking arrangements may be provided for holding such section C (or D) in locked position.

If desired, the hinge-pin 57 may be removed from the tubular portions 58" and 59" of the hinge sections 58 and 59 of either one of the cover sections C or D and such portions 58" or 59" may be rearranged within the spaced sections 58' or 59' in a manner eliminating the scale carrier section D. Or the upper section C may be removed for placing upon the platform 11 large items for weighing purposes; or if desired, the washing machine may be provided with a drawer section 61 for housing therein a scale of suitable size.

I desire to point out the fact that the disclosures herein are for illustrative purposes only and not for purposes of limitation. For example, if desired my scale structure may be made in the shape or style of a floor scale; the weighing-member 21 can be adjusted upon the elements 16 for various desirable weighing purposes. The fact that my indicating structure can be moved front-wardly will to a great extent facilitate the reading of the numerals and thus popularize such scale structure. Naturally, various changes in form of structure may be resorted to without departing from the spirit of the herein invention.

From the above it is evident that my invention, herein illustrated and described, teaches an entirely new form of structure in the art of making washing or drying machines in combination with a scale structure. The fact that my scale-structure is positioned at the top-portion of the machine will render such scale ever-ready for weighing purposes without interfering-with or disrupting the washing or drying operation of such machine. The section D may cover the washing or drying compartment indicated by numeral 10 (see FIG. 1), whereas the section C may be placed in an open position exposing the platform 11 for weighing purposes (see FIG. 3). If however large items are placed upon the platform 11 (which would ordinarily cover the indicating numerals from view), the dial may then be moved out frontwardly of the platform to enable the user of the scale to read the indicating numerals without any obstruction. The fact that the cover C may cover the scale structure when the latter is not in use will provide protection for such scale against possible damage, prolonging its life and usefulness. Also the fact that the section C may be removed from the section D and the section D may be removed from the machine A and the section C may be secured directly to the machine A and the section D including the scale structure may be placed elsewhere for useful purposes, provides the user with a plurality of useful implements which may be separated from each other or united into a unitary structure.

It will thus be seen that I have invented and perfected an assembled machine comprising a combination of several individually useful units, which can be utilized as an assembled structure or as individual units for various purposes; a structure which is practical and useful, a combination of parts performing desirable functions; and although I have shown certain preferred forms or illustrations in order to explain and describe the novelty of my invention, yet, by showing such structure, I do not, by any means, limit myself to these structures, nor to the terms used in describing same, as they are for illustrative purposes only. Various suggestions and changes of structure may be resorted to, and I desire it to be understood that I have same in mind when showing and describing this invention, and seek protection by Letters Patent. And although I have mentioned in describing this invention of what material certain parts may be made, how they may be formed, shaped or styled, and how they may be assembled, yet I desire it to be understood that this structure, or the individual units, or parts thereof, may be made of any suitable material, and shaped, formed, styled or arranged in any desirable manner, and assembled in any convenient way, and that various changes may be resorted to without departing from the spirit of this invention.

I claim:

1. A weighing scale comprising, in combination, a frame, a plurality of pendulums pivotably mounted in said frame, said pendulums each having a weighted end and a free end, a platform, means connecting said platform with the free ends of said pendulums, a rack connected to said platform and movable vertically therewith, an indicator shaft, a pinion on said shaft, said pinion engaging said rack, said shaft being rotatably mounted in said frame, a first sleeve slidably positioned on said shaft and rotatable therewith, indicia on said first sleeve, a second sleeve slidably mounted in said frame, said second sleeve surrounding said first sleeve, spring means mounted on said second sleeve and engageable with said first sleeve for momentary connection of said sleeves for united sliding movement, said second sleeve having two axially separated positions, the first of said positions being rearward in said frame and the second being forward in said frame, said spring means being free of said first sleeve in said first position and engageable with said first sleeve at a point between said positions and forward of said point, a light bulb mounted in said second sleeve, electrical means selectively operable to light said bulb, and means to operate said electrical means in response to forward movement of said second sleeve, said second sleeve having an aperture therein through which said indicia may be viewed.

2. A weighing scale comprising a frame and a weighing mechanism including a platform said frame having a bottom portion and side walls and an open top forming a casing, said platform supported by the said mechanism and being substantially coextensive in size with the said opening, counter balancing means, said counter balancing means supported by the said frame and connected to the said platform to balance said platform in a vertically depressed position corresponding to the weight of an object placed upon the said platform, an illuminated weight indicating means, said indicating means operable by the said platform, said indicating means comprising a horizontally extending tubular shaft having a non-circular external periphery rotatably supported by a side wall of said casing, a tubular indicator element, said indicator element having a non-circular internal periphery conforming in shape to the said tubular shaft and mounted upon the said shaft for rotation therewith and for axial adjustment relative thereto and having weight indicia peripherally disposed about the distal end thereof, a cylindrical shield, said shield located about the said indicator element and being slidably non-rotatably supported coaxially of said shaft by an aperture in an opposite wall of said casing and adapted to be moved axially from a retracted position within said casing to an extended partially exposed position exteriorly of said casing, said shield having a window opening and an index and an internal illuminating means located adjacent the said indicia on said indicator element, means for concurrently moving the indicator element axially upon movements of said shield thereby to expose said window opening and said weight indicia exteriorly of said casing when said shield is in extended position, energizing means for said illuminating means including means on said shield for enabling said energizing means when said shield is extended, and drive transmission means connecting said shaft to said platform to rotate said shaft when said platform is depressed.

References Cited in the file of this patent

UNITED STATES PATENTS

| | | |
|---|---|---|
| Re. 17,017 | Buchholz et al. | July 3, 1928 |
| 729,841 | Cahill | June 2, 1903 |
| 1,264,834 | Martin | Apr. 30, 1918 |
| 1,294,167 | Ribble | Feb. 11, 1919 |
| 1,532,935 | Patton | Apr. 7, 1925 |
| 1,947,282 | Theis | Feb. 13, 1934 |
| 2,057,024 | Gunnison | Oct. 13, 1936 |
| 2,107,888 | Dean | Feb. 8, 1938 |
| 2,141,236 | Benedict | Dec. 27, 1938 |
| 2,246,104 | Osuch | June 17, 1941 |
| 2,246,105 | Osuch | June 17, 1941 |
| 2,393,373 | Hendrix | Jan. 22, 1946 |
| 2,412,270 | Johnson | Dec. 10, 1946 |
| 2,505,237 | Dwyer | Apr. 25, 1950 |
| 2,555,716 | Todhunter | June 5, 1951 |
| 2,560,945 | Goldberger | July 17, 1951 |
| 2,656,236 | Wasemann | Oct. 20, 1953 |
| 2,685,441 | Baade | Aug. 3, 1954 |

FOREIGN PATENTS

| | | |
|---|---|---|
| 924,018 | France | Mar. 3, 1947 |
| 961,989 | France | Oct. 28, 1949 |
| 1,013,063 | France | Apr. 30, 1952 |
| 475,222 | Italy | Oct. 20, 1952 |
| 74,719 | Netherlands | May 15, 1954 |